US007707125B2

(12) United States Patent
Haji-Valizadeh

(10) Patent No.: US 7,707,125 B2
(45) Date of Patent: Apr. 27, 2010

(54) UTILITY MANAGEMENT SYSTEM AND METHOD

(75) Inventor: Alireza Haji-Valizadeh, Twinsburg, OH (US)

(73) Assignee: ControlSoft, Inc., Highland Heights, OH (US)

( * ) Notice: Subject to any disclaimer, the term of this patent is extended or adjusted under 35 U.S.C. 154(b) by 558 days.

(21) Appl. No.: 11/297,872

(22) Filed: Dec. 7, 2005

(65) Prior Publication Data

US 2007/0130093 A1 Jun. 7, 2007

(51) Int. Cl.
*G06F 17/00* (2006.01)
*G05D 11/00* (2006.01)
*G05D 7/00* (2006.01)
*G05B 11/01* (2006.01)

(52) U.S. Cl. ....................... 705/413; 700/284; 700/282; 700/16

(58) Field of Classification Search ................. 705/412, 705/413, 7, 8, 30; 700/16, 14, 67, 282, 296, 700/284
See application file for complete search history.

(56) References Cited

U.S. PATENT DOCUMENTS 4,847,782 A * 7/1989 Brown et al. ................ 700/296
4,971,136 A * 11/1990 Mathur et al. ............... 165/240
4,998,024 A * 3/1991 Kirk et al. ...................... 307/40
5,021,939 A * 6/1991 Pulgiese ...................... 700/14
5,191,521 A 3/1993 Brosilow
5,468,088 A * 11/1995 Shoemaker et al. ......... 166/245
7,130,719 B2 * 10/2006 Ehlers et al. ................ 700/276
2007/0154319 A1 * 7/2007 Stiles et al. ................... 417/42

OTHER PUBLICATIONS

Merleno, D.J. Energy Management, Ohio Section AWWA Spring 2000, pp. 35-39.
Stephanie Pegg, "An Online Optimised Pump Scheduling System", Proceedings of the ORSNZ Conference Twenty Naught One, 2001.

* cited by examiner

*Primary Examiner*—Igor N Borissov
(74) *Attorney, Agent, or Firm*—Renner, Otto, Boisselle & Sklar, LLP

(57) ABSTRACT

Disclosed are a system and method for controlling a water supply system having at least one pump and at least one storage facility. Also disclosed are a system and method of establishing a pumping schedule for a water supply system having at least one pump and at least one storage facility. The systems and methods are adapted to minimize the economic cost associated with operating the pump(s) of the water supply system. Another aspect of the systems and methods includes meeting operational constraints of the water supply system.

15 Claims, 3 Drawing Sheets

UTILITY MANAGEMENT SYSTEM AND METHOD

TECHNICAL FIELD

The present invention relates generally to a system and method for managing a utility, such as a municipal or privately operated water system. The invention is more particularly directed to optimizing the use of utility assets that have static or variable operating costs to reduce overall operating costs of the utility while meeting consumption demands placed on the utility and requirements imposed on the utility.

BACKGROUND

In a municipal or privately operated water system, one or more pumps may be used to move water into or out of one or more storage facilities, such as a container, an elevated tank (e.g., a water tower) or reservoir. The conventional approach to operating the system is to run at least one of the pumps when an amount of water in any one of the storage facilities reaches or drops below a predetermined threshold. The conventional approach is relatively inefficient and can lead to excessive economic operating costs for the water system.

Accordingly, there is a need in the art for an enhanced system and method for managing a utility, such as a water system.

SUMMARY OF THE INVENTION

According to one aspect of the invention, a method of controlling a water supply system having at least one pump and at least one storage facility includes a) establishing a scheduling day having a length and dividing the scheduling day into a plurality of time periods; b) scheduling a water inflow amount to the storage facility for each time period of an entire upcoming scheduling day length to establish a pumping schedule; c) for the first time period of the pumping schedule, controlling the at least one pump in accordance with the pumping schedule; and d) after a time period elapses, repeating b) and c) to reestablish the pumping schedule for each time period of the next entire upcoming scheduling day length and control the at least one pump in accordance with the inflow amount scheduled for the first time period of the reestablished pumping schedule.

According to another aspect of the invention, a method of establishing a pumping schedule for a water supply system having at least one pump and at least one storage facility includes establishing a scheduling day having a length and dividing the scheduling day into a plurality of time periods, each time period having an associated utility cost rate; and establishing an initial pumping schedule constrained by pumping capacity for the scheduling day, the initial pumping schedule having an inflow amount for each time period of the scheduling day that assigns inflow to at least one lowest available cost rate time period before higher cost rate time periods.

According to yet another aspect of the invention, a method of establishing a pumping schedule in a system having at least one pump to move a material with respect to at least one storage facility, includes establishing a scheduling day having a length and dividing the scheduling day into a plurality of time periods, each time period having an associated utility cost rate; and establishing a pumping schedule for the scheduling day, the pumping schedule constrained by pumping capacity of the system and constrained by at least one of a minimum level constraint or a maximum level constraint, wherein the schedule establishing assigns inflow to at least one lowest available cost rate time period before higher cost rate time periods and such that a material level in the at least one storage facility satisfies the at least one constraint.

The methods alternatively can be embodied as an apparatus that has a process to execute code in order to carry out the various method steps.

BRIEF DESCRIPTION OF DRAWINGS

These and further features of the present invention will be apparent with reference to the following description and drawings, wherein.

DESCRIPTION

Figure 1:
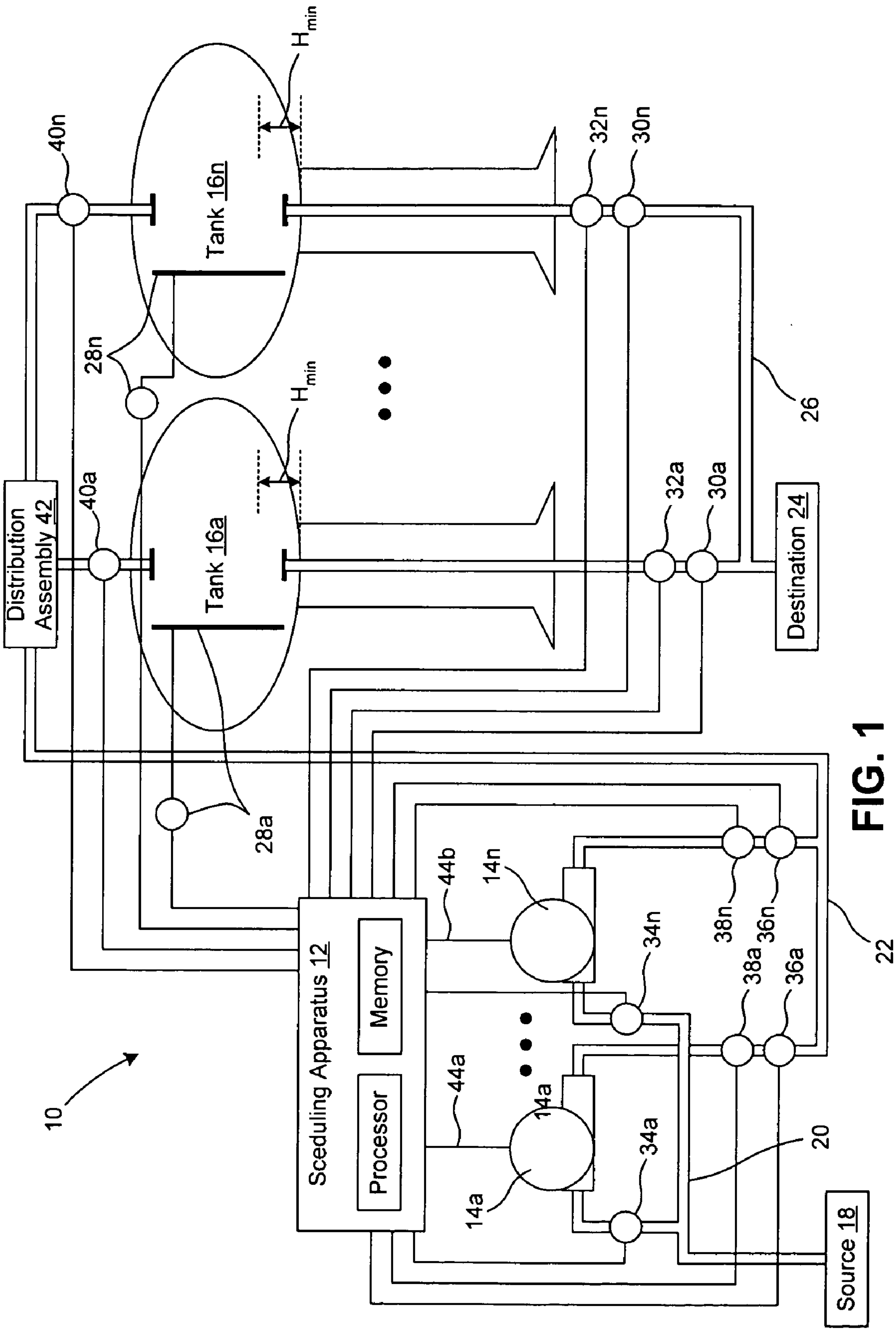
FIG. 1 is a schematic diagram of a water system having a scheduling apparatus according to aspects of the present invention.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

A. INTRODUCTION

The system and method disclosed herein is described in the example context of a water supply system having one or more pumps and one or more water storage facilities. It will be appreciated that the principles of this example can be extended and/or modified to be applied to most systems that include an asset having an operation that can be scheduled based on available storage capacity of the system and/or predicted future demand on the system. For instance, similar to the manner that a pump moves water into a storage facility for future use, a pump can be used to regulate the amount of oxygen present in water stored in a water reservoir. As a result, such an oxygen supply system can be managed using the system and method described herein. Another example is a system where a pump or pumps move water our of a storage facility or facilities and demand level is determined by storage system inflow.

In the illustrated embodiment of a water supply system, the system can be controlled by a scheduling apparatus. For instance, the scheduling apparatus can be a computer system with graphical user interface (GUI) programming that determines when pumps in the system should be run to move water into storage facilities in a cost effective manner based on future demand for the water and the cost of pumping water. The scheduling apparatus is particularly well adapted to directly control the pumps or set forth a schedule of manual pump operation so that an optimum amount of water is pumped at optimum times.

In the system, the scheduling apparatus can account for a variety of factors relating to any particular water supply system. A number of factors will be discussed below in detail and can include various combinations of the following examples: 1) the number of utility cost rate segments (e.g., each segment associated with a time period in which electricity, fuel, supply water, labor and so on has a particular price per unit); 2) the number of pumps in the system and the power or water moving capacity of each pump; 3) the operative nature (e.g., constant speed or variable speed) of each pump; 4) the number of water storage facilities and the size, shape, volume and/or capacity of each water storage facility; 5) a predetermined association of a certain pump(s) to a certain water storage facility(ies); 6) manual or automatic control of each pump, 7) user ability to activate or deactivate a pump, which may override an automatic control implementation; 8) implementation of a pump usage scheme, such as a rotating scheme (e.g., round robin pump selection), a random scheme, a prioritized scheme (e.g., by ascending or descending pump power) or a combination of pump usage schemes; 9) operation in a water level control mode; 10) user settable and/or tunable water demand prediction profiles; 11) dynamic projected water demand; 12) minimum and/or maximum water level and/or pressure constraints placed on the water supply system; and/or 13) operating and/or fault conditions for each pump and/or each storage facility.

The scheduling apparatus also can track and/or output certain data relating to the water supply system, including various combinations of the following examples: 1) monitoring and displaying past water usage, 2) evaluating and displaying past costs associated with the water supply system; 3) evaluating and displaying cost savings generated by the scheduling apparatus; 4) projecting water demand for various time periods, such as hours, days or weeks, or time windows; 5) generating alarms and/or alerts for each pump and/or each storage facility; 6) monitoring and displaying working condition data for each pump and/or each storage facility; and/or 7) generating diagnostic messages.

B. WATER SUPPLY SYSTEM

B(i). System Configuration

Referring to FIG. 1, illustrated is a water supply system 10 that includes a scheduling apparatus 12 (also referred to as a time and date pumping module), one or more pumps 14*a* through 14*n* (sometimes referred to as pumping stations) and one or more storage facilities, also referred to herein as tanks 16*a* through 16*n*. The system 10 could be, for example, a water supply system for a municipality, a collection of municipalities, an industrial facility or other publically or privately operated water supply system.

The pumps 14 are configured to draw water from a water source 18 through a network of pipes 20 and deliver the water to the tank(s) 16 through a network of pipes 22. In the illustrated embodiment, the tank(s) 16 is an elevated tank that is commonly referred to as a water tower. As will be appreciated, the storage facility can be a facility other than a tank, such as a reservoir.

Water may be delivered from the tank(s) 16 by gravity and/or pumps to a destination 24 by an output pipe network 26. The destination 24 can be a water customer, water consuming item, a network of pipes that delivers water to plural customers and/or consumers, another storage facility and/or the tank 16 (e.g., to recycle water to the tank 16). In addition, certain destinations 24 may be configured to receive water from only one tank 16 or selected tanks 16.

Various sensors provide information about the system 10 to the scheduling apparatus 12. For example, a water level sensor 28 can generate and output a signal indicative of water level within an associated tank 16. A water outflow sensor 30 can generate and output a signal indicative of water outflow amount from an associated tank 16. A water pressure sensor 32 can generate and output a signal indicative of water outflow pressure from an associated tank 16. Each pump 14 can be associated with a water inflow pressure sensor 34 that can generate and output a signal indicative water inflow pressure for the associated pump 14. Each pump 14 can be associated with a water outflow pressure sensor 36 that can generate and output a signal indicative water outflow pressure for the associated pump 14. Each pump 14 can be associated with a water outflow amount sensor 38 that can generate and output a signal indicative water outflow amount for the associated pump 14. A water inflow sensor 40 can generate and output a signal indicative of water inflow amount to an associated tank 16.

The various signals generated and output by the sensors 28 to 40 can be or include any appropriate transmitted or stored data value, including electrical signals in analog or digital form. These signals can be transmitted, downloaded or otherwise communicated to the scheduling apparatus 12 for use in management of the overall water supply system 10.

Although not directly shown, valves can be associated with the pipe networks 20, 22 and 26. In some water supply systems, the sensors 28 to 40 may be associated with one or more valves. If desired, the position (e.g., open or closed) of the valves can be controlled by the scheduling apparatus 12.

When the system 10 includes plural tanks 16, the system 10 can be arranged such that water can be pumped from any pump 14 or set of pumps 14 to any tank 16 using a distribution assembly 42. The distribution assembly 42 can be a set of valve and associated piping to direct water to the desired tank 16. In other arrangements, a pump 14 may be arranged to deliver water to only one tank 16 or a selected group of tanks 16.

In the illustrated embodiment, the pumps 14 are placed under the control of the scheduling apparatus 12 and can be individually controlled to pump water. For example, the pumps 14 can be turned on or off by the scheduling apparatus 12 over command links 44, such as wireless or hardwired communication lines. At any one time, no pumps 14 can be operating, a selected one of the pumps 14 can be operating, plural selected pumps 14 can be operating or all of the pumps 14 can be operating. Certain pumps 14 may be capable of operating at more than one speed and, in such cases, the scheduling apparatus 12 can control the speed of the variable speed pumps 14. In other embodiments, the pumps 14 can be manually operated by a person or equipment other than the scheduling apparatus 12, but with the scheduling apparatus 12 providing information and guidance regarding pump operation.

In one embodiment, the scheduling apparatus 12 can be a computer that executes a logic routine to carry out the functionality described herein. If the scheduling apparatus 12 is implemented with a logic execution system (e.g., general purpose computer or dedicated circuitry), the logic routine can be embodied as software or other executable code and the logic routine can be stored in a memory. Therefore, it will be appreciated that the logic routine can be embodied as or in a computer readable medium.

B(ii). General System Management

The scheduling apparatus 12 can be configured to manage the pumping of water into the tank(s) 16 in a manner so as to minimize operating cost for the system 10 as a whole. The scheduling is based on characteristics of the individual components of the system 10 and is regularly updated based on predicted future demand. For example, data regarding predicted future demand and data regarding the system 10 components can be input to the scheduling apparatus 12, which uses that data to manage the system 10 as whole.

At the same time, the scheduling apparatus 12 is configured to satisfy any operating constraints for the system 10 to the greatest extent possible. Operating constraints on a water system can include, for example, a minimum water pressure requirement for water downstream of the tank 16 and a minimum water level requirement for water in the tank 16. Often, the minimum water level requirements are established by a fire department that may depend on water from the tank 16 to extinguish fires. The operating constraints may be associated with constant or changing values and/or specified to the scheduling apparatus 12 in different manners (e.g., minimum water level could be specified as water volume or as height of water in the tank 16).

With conventional pumps 14, the pumping of water with the pumps 14 consumes power that has an associated cost. For example, electric power from an electric utility provider can be used to drive the pumps, although other energy sources (e.g., natural gas, fuels, hydrodynamic, wind, solar energy, etc.) may be used in the operation of the pumps and those alternatives many not always be available. While the illustrated tank 16 is a relatively passive assembly, there may be operational costs involved with the tank 16 in addition to the pumps 14. Valves and other system 10 components can also have operational costs.

For purposes of the description herein and by way of an example, it will be assumed that the illustrated pumps 14 are electric pumps supplied by electricity from an electric utility. As will be appreciated, the cost of electricity to power the pumps 14 may vary during the course of a day, from day to day, monthly or seasonally, and/or may vary based on consumption. For example, electricity may be cheaper at night or during the weekend. The cost of electrical energy to operate a pump at any one time can be referred to as the electric utility cost rate.

The cost of water from the source 18 may vary. For example, water may be purchased for the system 10 from a regional water supplier and the cost may vary during the course of a day, from day to day, monthly or seasonally, and/or may vary based on consumption.

The scheduling apparatus 12 accounts for electric utility rate variations, water source rate variations and any other variable or fixed rate costs associated with the system 10 in managing operation of the pumps 14 to attempt to meet expected demand and satisfy any operating constraints. Also considered is the operating efficiency, pumping power and/or pumping capacity of each pump 14 in the system. Another consideration may be the "hardness" of any operating constraints. For example, certain constraints may be "hard" constraints that cannot be breached without certain consequences and certain constraints may be "soft" constraints, a breach of which can be tolerated for a certain duration and/or by a certain amount. Yet another consideration may be alternative ways water could get into the tank 16, such as openness of the tank to rain or snow.

B(iii). Overview of Inflow Scheduling and Pump Operation

Figure 2:
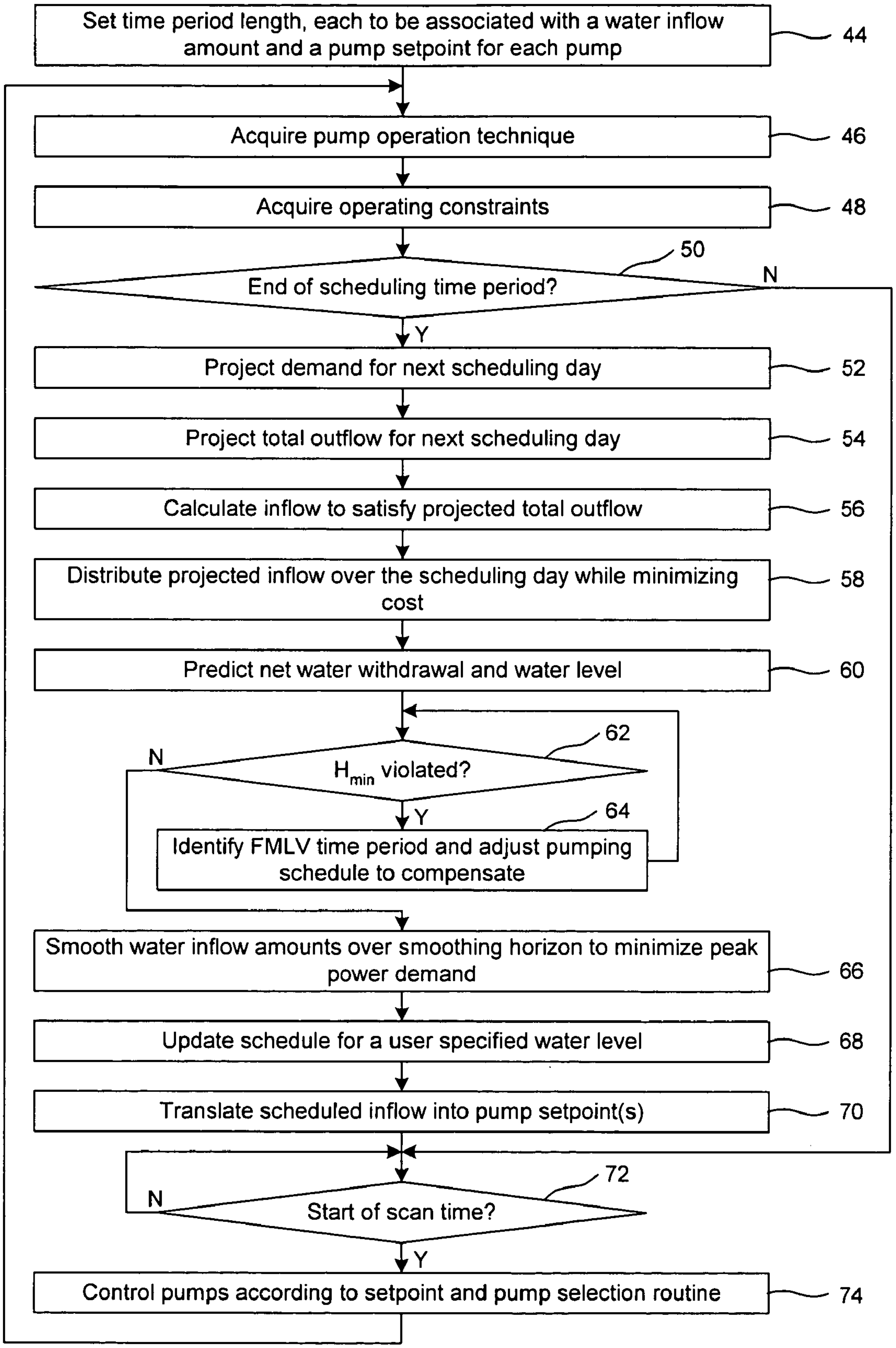
FIG. 2 is a flow chart showing an example method of controlling the water system in accordance with aspects of the present invention.

With additional reference to FIG. 2, shown is a flow chart that represents a method of pumping water that could be carried out by the scheduling apparatus 12. The method can be embodied as executable logic (e.g., software). Accordingly, disclosed is a system and method for controlling the pumping of water to minimize operating cost while attempting to maintain enough water in the tank(s) to satisfy projected demand and any operating constraints. It will be appreciated that a variety of cost factors can be considered by the scheduling apparatus 12, such as the cost of electricity for the pumps 14, the cost of water from the source 18, etc. In the description that follows, only the utility cost in operating the pumps 14 is considered and, for purposes of an example, the utility cost is an electric utility cost rate. It will be appreciated that the skilled artisan can extend the techniques described herein to alternative and/or additional cost factors.

The flow chart starts in block 44 by setting the a time period length. The time period length is established by dividing a scheduling day (also referred to as a scheduling time horizon) into plural time periods (also referred to as time segments). A scheduling day is a length of time for which the scheduling apparatus 12 plans, or schedules, water inflow to the tank 16 to minimize costs. For simplicity of the description herein, the scheduling day will be set as a twenty-four hour time period. However, the scheduling day could be longer or shorter and need not corresponding to any conventional calendar time periods. The time period length could have a duration of, for example, 15 minutes, 30 minutes, an hour, etc. By way of example for the description herein, the time period length will be assumed to be 15 minutes. Therefore, in this example, there are 96 time periods in each 24 hour scheduling day.

In one embodiment, the length of each time period is selected so that the electric utility cost rate for operating the pumps 14 is constant during each time period, but the rate may vary from time period to time period. For example, electricity rate may be one amount during several consecutive time periods and increase for the next several time periods, but the rate does not change during any one of the time periods. Depending on how rapidly electric utility cost rates change, the length of the scheduling day can be selected to span the duration of each electric utility cost rate segment at least once.

The time period represents an update time for the scheduling apparatus 12 and the operation of the pumps 14. As will become more apparent below, the planned operation of the pumps 14 as determined by the scheduling apparatus 10 will be revisited and subject to updating on a periodic basis consistent with the elapsing of each time period.

In one embodiment, the time period length is selected to correspond with a time period over which the power demand level of the pumps 14 is measured by the electric utility in order to establish the peak demand of the system 10. For example, the time period length could equal or evenly divide into the power demand calculation time period.

With continued reference to block 44, the scheduling apparatus 12 associates a water inflow amount for each tank 16 or the tanks 16 in the aggregate with each time period of the upcoming scheduling day as part of the approach to minimizing cost over the scheduling day. As will be explained, those water inflow amounts are incrementally updated after each time period elapses. To satisfy the water inflow amounts, the scheduling apparatus 12 establishes a pump setpoint (e.g., on. off or variable rate) for each pump for each time period of the upcoming scheduling day. The pump setpoint can be established by translating the scheduled inflow into the various pump setpoints.

The scheduling process described herein can be carried out for all tanks 16 in the system 10 at once or carried out for each tank 16 individually. To simplify the following description, the description will refer to tanks in the singular (e.g., tank 16), even though there may be more than one tank 16 in the system 10.

In block 46, a pump operation technique is determined. The pump operation technique can be acquired from user-selectable and/or settable options or from a default setting. The pump operation technique preferably assists in distributing the workload among the various pumps 14 so that no single pump 14 bears the majority of the burden in delivering water to the tank 16. One suitable technique is a round-robin approach so that the pumps 14 are used in rotation. Another suitable technique is a random approach to pump 14 selection. Prioritization of pumps could also be used. For example, the pumps can be selected in order of descending or ascending pumping power and/or with preference to pumps that are already operating. In one embodiment, priority is given to smaller pumps working at full capacity versus larger pumps since smaller pumps are more likely to consume less power than more powerful pumps. Also, pumps working in full capacity tend to demonstrate better efficiency. In another embodiment, actual operational data (e.g., electric usage per unit volume of water pumped) for each pump can be used to establish pump priority. As will be discussed below, pump setpoint control can be realized by using a scheme referred to as an "on/off time proportional control scheme."

In block 48, operating constraints are determined. In one embodiment, operating constraints such as minimum water pressure requirements and minimum water volume/level requirements imposed on the system 10 are acquired from user-settable values and input to the scheduling apparatus 12. Preferably, any minimum water pressure requirement is translated in a water level value. For example, the user can measure the minimum water level in the tank 16 that satisfies the water pressure requirement. From these constraints, an operational minimum water level constraint can be established for the scheduling apparatus 12. Determination of the operational minimum water level constraint will be described in greater detail below. An operational maximum water level constraint also can be established.

In block 50, the scheduling apparatus begins to use the parameters established in blocks 44 to 48 to schedule inflow. In block 50, it is determined if the current scheduling time period has elapsed. If the time period has not elapsed, the process moves to block 72, which is described in more detail below. It is noted, however, that upon a negative determination in block 50, no changes to pump setpoints are made and the pumps continue to operate in accordance with setpoints established in the preceding iteration of the process when a positive determination was made in block 50. If the time period has elapsed, the next scheduling time period is started and the logical operation progresses to block 52.

As a matter of general operating procedure in the illustrated embodiment, during each time period the scheduling of the pumps is determined for a full scheduling day starting with the first time period of the scheduling day. Although pump operation for a full scheduling day is determined, that established schedule is only used to control the pumps for one time period (e.g., the current time period or the next time in an embodiment where the scheduling and pump operation are separated by a time period). During the following time period, the pumps are operated based on a revised schedule established by looping through the scheduling routine on a time period by time period basis. This operational scheme can be referred to as a dynamic predictive scheduling process.

In block 52, the demand for water from the system 10 is determined for the scheduling day (e.g., the next 24 hours starting at the present time). Preferably, such determination is as precise as determining demand for each time period of the scheduling day. The projected demand is stated in the form of a required outflow amount during each time period. The outflow amount for a time period can be expressed in units of gallons (or other volume, such as liters) per minute and can be obtained by dividing the required volume of water for the time period by the length of the time period.

In one embodiment of predicting demand, a daily water outflow profile is established using data from a length of time that is typically longer then the scheduling day, such as a multiple of the scheduling days (e.g., one week, a number of consecutive prior days, etc.). From this profile, the outflow demand for each time period of the scheduling day is projected. Preferably, when determining an outflow demand profile, a technique that includes a time-windowed weighted average scheme to forecast water demand is used. For instance the scheduling apparatus 12 can give greater weight to the water outflow of more recent days and less weight to older outflow data and/or where the same time period from prior days is given greater weight or 100 percent weight for the time period for which outflow is being predicted. In another example, prior weekday outflow can be weighted higher that weekend outflow if the current scheduling day is a weekday and vice versa if the current scheduling day is a weekend.

Next, in block 54, the total outflow from the tank 16 to be compensated by inflow for the entire length of the scheduling day is determined. To determine total outflow, the scheduling apparatus can add an initial excess inflow to the tank 16 to the sum of projected demand outflows for all time periods in the scheduling day obtained in block 52. It is noted that the initial excess inflow can be negative. The initial excess inflow represents existing water in the tank 16 that can be used to compensate for projected outflow. In one embodiment, the initial excess inflow is the negative of a value obtained by subtracting the operational minimum water volume (referred to as $H_{min}$) from the current water volume and dividing that difference by the length of one time period. When water height is above $H_{min}$, initial excess inflow is negative.

Taking the initial excess inflow into consideration allows the scheduling apparatus to use a variety of pumping schemes. For example, scheduling could be based on pumping in full capacity during the lowest electric utility cost rate when it is typical that the electric utility imposes the minimal charge for energy usage with no or little charge for peak power demand. Another example is to pump at full capacity when the volume of water in the tank 16 is at or near minimum level operating constraints. Inflow scheduling will be described in greater detail below.

In block 56, the scheduling apparatus 12 determines the total required amount of water inflow to the tank 16 that during a single time period that could compensate for the projected total outflow for the entire scheduling day as determined in block 54. In many cases, the calculated inflow over the single time period will be much greater than the active pumping capacity of all pumps 14 in the system 10. Thus, the calculated inflow is distributed over plural time periods by proceeding to block 58.

In block 58, the scheduling apparatus 12 distributes the inflow from block 56 over the time periods of the scheduling day such that the scheduled inflow for each time period is within active pumping capacity of the system 10 and to minimize electric utility cost. For example, each time period can be ordered based on the utility cost (or rate) associated with the time period. Starting with the lowest utility cost time period (or the later one of the lowest utility cost time periods if there are more than one in the scheduling day), the scheduling apparatus 12 assigns that time period with as much of the required inflow as can be achieved with the enabled (e.g., active) pumps 14 in the system 10. In other words, full capacity pumping is assigned to one of the time periods with the lowest operational rate. If additional water inflow is needed, then the time period(s) with the same utility rate (if available) or the next lowest utility rate are assigned full capacity pumping. When there is more than one time period having the same utility rate, the scheduling apparatus 12 gives priority to the later of the time periods. This process is repeated until the aggregate inflow assigned to the time periods equals the inflow from block 56 and a pumping schedule is in terms of scheduled inflow for each time period is established. The scheduling apparatus 12 allows the user to take the availability of any pump(s) out of the system 10 for purposes of service or repair and the scheduling apparatus 12 incorporates corresponding changes in the scheduling process by updating the available pumping capacity at the start of the next iteration of the process (e.g., upon a positive determination in block 50).

Water inflow distribution according to the foregoing scheme does not take into consideration operational constraints. Subsequent blocks in the illustrated flow chart treat the operational constraints while continuing to reduce economic costs, including smoothing the pumping schedule to minimize customer peak power demand cost. Many electric utilities track customer peak power demand and impose a charge based on power demand.

In block 60, the scheduling apparatus 12 predicts the net water withdrawal from the tank 16. Predicting net water withdrawal from the tank 16 may be accomplished by subtracting the total scheduled inflow for each time period (block 58) from the projected outflow for each corresponding time period (block 54). The result is a net water withdrawal value for each time period over the horizon of the scheduling day.

Then, using the current water level in the tank 16, the net water withdrawal value for each time period and parameters of the tank 16 (e.g., the tank's shape), the scheduling apparatus 12 predicts the water level after each time period. The result is a predicted water level at the end of each time period. Tank parameters can be defined by a nonlinear function that represents a relationship of water level and water volume in the tank and will be described in greater detail below.

In block 62, using the water levels of block 60, the scheduling apparatus determines if the operational minimum water level constraint $H_{min}$ has been violated for any of the time periods using the pumping schedule constructed thus far. If there is a violation, the first time period in which the minimum water height operating constraint is violated will be referred to as the first minimum level violation (FMLV) time period.

If a positive determination is made in block 62, in block 64 the FMLV time period is identified. Also determined is the water volume withdrawal in terms of net outflow that has caused the violation of the operational minimum water height constraint. Then, the scheduling apparatus 12 can determine how much inflow is needed to compensate for the water volume withdrawal that caused the violation and updates the pumping schedule accordingly.

Updating the pumping schedule to compensate for a minimum water height operating constraint violation can be carried out by removing the compensating amount of inflow from the pumping schedule for time periods after the FMLV time period starting from the highest utility cost time period and moving toward the lowest utility cost time period. If multiple time periods after the FMLV time period have the same utility cost, then priority is given to the chronologically sooner of the time periods when removing inflow. Then, the scheduling apparatus reschedules pumping for the time periods before and including the FMLV time period to include the compensating amount of inflow starting with the lowest utility cost time period and moving to the highest utility cost time period. If multiple time periods have the same utility costs when distributing the compensating amount of inflow over the time periods before and including the FMLV time period, then priority is given to the later time periods. The updating of the pumping schedule in this manner can be viewed as the same process for scheduling the pumping in block 58, but with an upwardly revised inflow target over a time horizon starting at the first time period and ending with the FMLV time period and with a downwardly revised inflow target over a time horizon for the time periods after the FMLV time period.

Thereafter, blocks 62 and 64 are repeated until there are no time periods in the scheduling day that violate the operational minimum water height constraint. Upon a negative determination in block 62, the operation proceeds to block 66. Although not illustrated in the flow chart, there may be systems 10 in which all the operational minimum water height constraint violating time periods cannot be removed. Typically, this will be caused by an inadequate amount of pumping capacity over any one or more time periods. In this situation, the scheduling apparatus 12 can end the iteration of blocks 62 and 64 and proceed to block 66. In addition, a diagnostic message can be generated that suggests to the user that there is not enough pumping capacity in the system 10.

In block 66, the scheduling apparatus smoothes the water inflow amounts for each time period in a selected portion of the scheduling day referred to as a smoothing horizon. In one embodiment, the smoothing horizon includes the current time period and subsequent time periods having the same utility cost rate. Smoothing of the water inflow can assist in minimizing the customer peak power demand. Smoothing the water inflow amounts can be accomplished in a variety of ways, examples of which are described in greater detail below. In one embodiment, the smoothing technique can be governed by two properties. First, the sum of the smoothed water inflow amount up to any time period in the smoothing horizon is at least as much as the scheduled water inflow amount for the schedule derived up to block 66. For example, if the smoothing horizon is five time periods long, the sum of the smoothed water inflows for the first three time periods will be same or greater than the total water inflow for the same three time periods before smoothing in block 66. Second, the variance of the smoothed schedule from time period to time period is smaller than the variance of the schedule established up to block 66.

Next, in block 68, the scheduling apparatus 12 can update the water pumping schedule to bring the lowest predicted water level in the tank(s) 14 during a scheduling day up to a user specified level that is higher than $H_{min}$. Typically, the lowest predicted water level in the tank(s) 14 during a scheduling day will be $H_{min}$. Water inflow to meet the user specified level can be considered a cushion for possible deviations in actual water demand versus the forecasted water demand. Water inflow to meet the user specified level is added to the lowest utility cost periods that have available pumping capacity (e.g., pumping capacity not consumed by the scheduling established thus far) so that water to satisfy the difference between the predicted level and the user specified level is added at the most cost efficient time(s). The added water inflow can be added, for example, to the latest available lowest utility cost time period and/or smoothed over the cost time periods having the same utility cost. In some systems, the user specified level can be used to force water recycling (e.g., by lowering the user specified level) or water recycling can be added regardless of a user specified water level. The addition of water to meet a user specified level is described in greater detail below.

In block 70, the scheduling apparatus 12 translates the scheduled water inflow for the first time period to a setpoint for each pump 14 in the system 10. In one embodiment, translating the scheduled water inflow to pump 14 setpoints is achieved using a closed loop control scheme, such as the on/off and time proportional control schemes described in greater detail below.

In one embodiment, pump selection within the control scheme can include at least two governing principles. The first possible governing principle establishes a pump utilization plan. The utilization plan can make pump selection based preferably on a random selection scheme or on a rotation basis (e.g., round robin approach), and/or with consideration to prioritization of the pumps. The pump utilization plan can establish a pump rotation period, such as a length of time corresponding to one or more scheduling time periods or a length of operating time for the pumps. Following each pump rotation period, the scheduling apparatus 12 selects the next pump in the utilization period to deliver water to the tank(s) 14. If more than one pump 14 is needed to satisfy the scheduled water inflow for the time period, the first pump is selected according to the utilization plan in the foregoing manner. The additional pumps 14 can be selected based on a secondary utilization plan, such as selecting the additional pumps 14 based on ascending or descending pumping power. In another embodiment, the secondary utilization plan can be configured to select the next pump according to a user defined order. In general, distributing pump operation can assist in maintaining system reliability by reducing reliance on only certain pumps.

The second possible governing principle for pump selection is to give priority to pumps that were operating in the immediately prior time period. The second governing principle can be implemented to override the pump selection process associated with the first governing principle. In this case, the first governing principle is used in the situation where no pumps were on in the preceding time period or in the situation when a pump was on in the preceding time period and the water inflow for the current time period specifies that an additional pump should be run. Using pumps that are already on reduces excessive on and off switching of pumps and minimizes costs associated with pump start-up.

After the translation in block 70, the process can proceed to block 72. In block 72, a determination is made as to whether a start of a scan time has been reached. The scan time can be much shorter than the length of the scheduling time period. For example, the length of the scan time can be about five second. If a negative determination is made in block 72, the process will cycle until a positive determination is made. Upon a positive determination in block 72, the process will proceed to block 74.

In block 74, the pumps can be controlled according to the setpoints established in block 70 and any pump selection routines. Pump operation will be described in greater detail below. If configured to do so, the scheduling apparatus 12 can send signals to the pumps 14 to control the pumps 14 to pump water in accordance with the setpoints. In other embodiments, the setpoints can be displayed or otherwise output to a user for manual pump operation. Thereafter, the process can return to block 46. By returning to block 46 at this point, the pump(s) 14 are controlled to deliver water to the tank(s) 16 in accordance with the pumping schedule established through block 68 for only the first time period of the scheduling day. Although the pumping schedule and pump setpoints are determined for each time period of an entire scheduling day, the pumping schedule and pump setpoints used for control of the pumps 14 for the time period following the first time period are reestablished by looping back through the flow chart starting at block 50.

Although the disclosed operation of the scheduling apparatus 12 and corresponding methodology indicates a specific order of executing functionality, the order of execution of the blocks can be changed relative to the order shown. Also, two or more blocks shown in succession can be executed concurrently or with partial concurrence. Certain blocks may also be omitted. In addition, functions, processes, commands, state variables, warning semaphores or messages can be added to the logical flow for purposes of enhanced utility, accounting, performance, measurement, or for providing troubleshooting aids, and the like. It is understood that all such variations are within the scope of the present invention.

B(iv). Overrides to Normal System Operation

Certain situations may indicate a reason to deviate from the pumping schedule established by the inflow scheduling routine illustrated and described in connection with FIG. 2. Accordingly, the scheduling apparatus 12 can continually monitor for these situations and control the pumps to compensate for the situation. While the pumping schedule is typically determined to avoid many of these situations, there is a possibility that one or more situations may arise as the result of an unexpected event. For example, water can be drawn more rapidly from the tank(s) 16 than expected in the event of fire that prompts the fire department to rely on water from the system 10.

One example condition may be when the water level approaches, meets or drops below a low level limit. The low level limit can be determined by averaging an advisory low water level $H_{low}$, for the tank and an absolute low water level for the tank. The advisory low water level for the tank and an absolute low water level $H_{ab\_min}$ for the tank can be value specified by the user or the tank's manufacturer. If the low level limit condition arises, one or more pumps can be turned on until the water level reaches a desired level, such as the advisory low water level. In one embodiment, all of the pumps are turned on to increase the level of water in the tank. Further, a deadband operational scheme (described below) can be used in this situation.

Another example condition may be when the water level approaches, meets or goes above a high level limit. The high level limit can be determined by averaging an advisory high water level $H_{high}$ for the tank and an absolute high water level $H_{ab\_max}$ for the tank. The advisory high water level for the tank and an absolute high water level for the tank can be value specified by the user or the tank's manufacturer. If the high level limit condition arises, any active pumps can be turned off until the water level reaches a desired level, such as the advisory high water level. Further, a deadband operational scheme (described below) can be used in this situation.

Yet another example condition may be when the water level approaches, meets or drops below the operational minimum height constraint $H_{min}$ as based on any water pressure and/or water level/volume constraints imposed on the system 10. In this situation, one or more pumps can be turned on until the water level reaches a desired level. In one embodiment, all of the pumps are turned on to increase the level of water in the tank. Pumping to compensate for an $H_{min}$ condition is described in greater detail below.

Other conditions that may prompt the scheduling apparatus 12 to turn on a pump(s) 14 or turn off a pump(s) 14 include a detected change in outflow rate from the tank(s) and/or a detected change in outflow pressure from the tank(s).

User based selections may invoke still other changes to the scheduling process. For example, the user may seek to empty all measurable water from the tank (e.g., for maintenance or cleaning), recycle water from the tank back into the tank, transfer water from one tank to another, or other action. During these actions, scheduling can continue to be carried out to meet demand and minimize utility cost.

C. COST OPTIMIZATION

Detailed Inflow Scheduling and Pump Control

To this point, disclosed has been a logical operation for the system 10. The scheduling and control functions of the system 10 and, in particular, the scheduling apparatus 12 can be expressed in terms of an ordered problem/solution format. The section under this heading will supplement the foregoing generalized description of the scheduling and control functions.

Notations in this section include the following:

T is the length of the prediction time horizon, referred to above as the scheduling day, and can be expressed in, for example, hours or minutes. For purposes of an example, T can be a 24 hour long horizon.

M is the number of time periods (or segments) in the prediction time horizon.

dt is the time period length. Preferably, T, M and/or dt should be selected so that M times dt equals T. For example, if T is 24 hours and dt is 30 minutes, then M can be 48 time periods. In one embodiment, an assumption is made that during each time period, the utility cost is constant.

t is the time period index, or chronological order of time periods. The order of time periods can be expressed as a series, such as t, t+1, . . . , t+M−1.

$C_t$ is the cost of pumping one gallon/minute in t-th time period and is a given (e.g., predetermined) value for each time period. As indicated, $C_t$ can include the electric utility cost and/or other costs, such as water source costs, fuel costs, etc.

$O_t$ is the real water outflow from tank in t-th time period and is a measured value.

$O_{t,est}$ is the projected outflow from the tank in t-th time period.

$R_t$ is the initial, or residual, flow at t-th time period that is compensated for in the T length time horizon. $R_t$ can represent the initial excess water in the tank, for which the scheduling apparatus 12 compensates in addition to water demand.

N is the number of pumps in the system. Individual pumps are represented by the notation j.

$X_j$ is the pumping power of the j-th pump and is specified in gallons/minute, although other units for or ways of expressing pumping power can be used.

$F_{max}$ is the maximum pumping power of the system 10 expressed in inflow (gallons/minute) and $F_{max}$ should equal the sum of $X_j$ (e.g., $F_{max}=\Sigma X_j$.

$F_{t,sch,(i)}$ is the inflow that is scheduled for t-th time period at the i-th iteration of the process. $F_{t,sch,(0)}$ (or 0-th iteration) corresponds to the schedule established by block 50-60 (or an initial pumping schedule established by scheduling constrained by pumping capacity) and the subsequent iterations refer to passes through blocks 62-64 (or a revised pumping schedule established by scheduling constrained by pumping capacity and water level constraints). The final iteration provides the inflow schedule by including the processing of block 66-70.

$H_t$ is the water level (m) at the end of t-th time period and is a measured value.

$H_{t,est,(i)}$ is the estimate for the water level (m) at the end of t-th time period at the i-th iteration of the process and is a derived value.

G(.) is a map that gives height of water versus volume of water in the tank(s), and is typically nonlinear. The map G(.) can be expressed in terms of a function defined by the shape and dimensions of the tank.

$G^{-1}(.)$ is the inverse of the G(.) map.

Q is the number of past days that are used in predicting water outflow.

$\alpha_i$ is the weight of the i-th past day's historical water outflow value in a weighted moving averaging scheme used to predict the next scheduling day's outflow. The weight can be tunable and/or specified by a user.

$\beta$ is a tunable averaging constant and is a number less than one.

C(i). Scheduling by Pumping Capacity

The techniques described in this subheading are directed to scheduling water inflow without considering the operational minimum water level constraint $H_{min}$ or other tank level limits. Also not considered is the cost of peak power demand. This portion of scheduling relates at least in part to the functionality described with respect to blocks 44-60 of FIG. 2. This portion of the scheduling is intended to assist in minimizing energy cost (e.g., dollar or other currency cost of consumed power, which can be expressed in kilowatt-hours or KWH) and is subject to available pumping power.

The initial scheduling minimizes equation 1 over $F_t$, $F_{t+1}, \ldots, F_{t+M-1}$ subject to equations 2 and 3.

$$\sum_{j=t}^{t+M-1} F_j C_j \quad \text{Eq. 1}$$

$$0 \le F_j \le F_{max};\ \text{where } t \le j \le (t+M-1) \quad \text{Eq. 2}$$

$$\sum_{j=t}^{t+M-1} F_j = I = R_t + \sum_{j=t}^{t+M-1} O_j \quad \text{Eq. 3}$$

The foregoing equations lead to a preliminary optimization of resources, where the cost function (C) represents the utility cost for pumping water. In the time period (j), the overall inflow is denoted by $F_j$ and the cost of utility is given by $C_j$. The objective is to obtain a set of positive real $F_j$ numbers such that the utility cost is minimized.

The constraint of equation 2 is related to the maximum pumping power in the network. The constraint of equation 3 is to maintain a water flow balance over a period of time, such as the scheduling day, and provides that during the period of time, water inflow could compensate for total water outflow, denoted by I. Total water outflow I takes into account both water outflow due to water demand and the initial excess inflow. Any minimum water level height constraint will be treated later.

Figure 3:
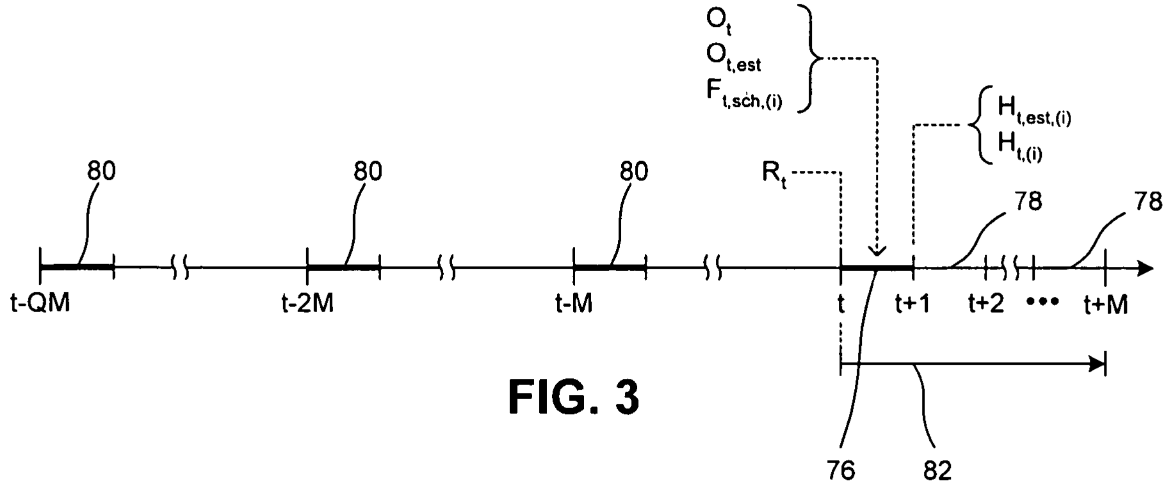
FIG. 3 is a time line showing time indexed pump scheduling for the water system.

With additional reference to FIG. 3, shown is a time line for the optimization scheme of this subheading. The time line shows evaluation of the first time period 76 corresponding to time period index t. Similar evaluations for subsequent time periods 78 in the scheduling day (e.g., time index t+1 through t+M−1) can be made. Arrow 82 corresponds to the scheduling day and represents a look ahead horizon to schedule pumping in the t, t+1, t+2, . . . , t+M−1 time periods. The values of $R_t$, $O_t$, $O_{t,est}$, $F_{t,sch,(i)}$, $H_{t,est,(i)}$ and $H_{t,(i)}$ are each measured, calculated or derived as is appropriate for the respective values.

$R_t$ in the above optimization scheme represents any additional water in the tank (referred to as excess inflow) that could be used for compensating for the outflow. $R_t$ could be a positive or negative value, and as schematically shown in FIG. 3, will be computed for the start of each time period.

When the scheduling problem is to be solved, the real outflow values, or $O_j$ values, are unknown. Thus a projected value, such as $O_{j,est}$, can be substituted for $O_j$ using an assumption that the projected outflow values are available. The actual water outflow for corresponding time periods 80 of prior scheduling days can be used to predict outflow for the first time period 76, or $O_{t,est}$. Projecting outflow will be described in greater detail below.

Since all $F_j$ terms are positive, if in equation 3 the value of I is negative, there will be no feasible solution. This case should only rise when $R_t$ is a negative number and there is enough excess inflow that can compensate for all outflow demand without any pumping. Therefore, the practical operational response can be to schedule no pump operation (e.g., turn off all pumps) for the time period.

If in equation 3 the value of I is zero, the solution is to have each $F_j$ equal zero. In this case, the scheduling apparatus 12 can schedule no pump operation (e.g., turn off all pumps) for the time period.

When I is greater than zero, since each $F_j$ and $F_jC_j$ terms are positive and the sum of $F_j$ terms equals I, an optimal inflow schedule is obtained using the following three steps, where after the first step is carried out, the second and third steps iteratively assign inflow to each of the time periods.

First, the time periods are ordered in an ascending utility cost rate order starting with the lowest utility cost rate and ending with the highest utility cost rate. Although the time periods are ordered based on utility cost rate for purposes of inflow assignment, the temporal order of the time periods is not changed (i.e., remaining is the chronological order of time periods and added is a cost rate order index). When two time periods have the same associated cost rate, then the time period that is chronologically later is given precedence in the cost rate order and is considered first. In this way, pumping is scheduled as late as possible among all time periods with the same associated cost rate. The policy of delaying pumping to the latest time assists when schedule smoothing to minimize peak demand is carried out. If, for a certain application, no schedule smoothing will be made, one could select to give precedence to chronologically early time periods having the same associated cost rate, thereby scheduling pumping as soon as possible.

Second, assign as much inflow as possible based on pumping capacity to the lowest cost rate time period that has not previously been assigned an inflow value. If two or more time periods have the same cost rate, inflow is assigned to the time period that is temporally furthest in the future as explained above. The establishment of the inflow scheduling for the time period, or $F_q$ for the time period, can be determined using table 1, where q represents the place of the time period in the ordered cost rate index of the time periods from the first step.

TABLE 1

| $F_q$ equals | Circumstance |
|---|---|
| $F_{max}$ | if $(I - (q + 1) \times F_{max}) \geqq 0$ |
| $I - q \times F_{max}$ | if $(I - (q + 1) \times F_{max}) < 0$ & if $(I - q \times F_{max}) \geqq 0$; $\forall q \ni 0 \leqq q \leqq M - 1$ |
| 0 | otherwise |

Third, if there are any time periods that have been not assigned an inflow value in the second step and additional water inflow is needed for the scheduling day, the second step is repeated, otherwise the inflow scheduling can end.

The second step implies that for all time periods in which inflow pumping is scheduled (time periods with a non-zero $F_q$), the system 10 will work with maximum pumping capacity (e.g., a "pump with all power" policy) except for one of the non-zero $F_q$ time periods that has less than maximum pumping capacity. The one non-zero $F_q$ time period with less than maximum pumping capacity is associated with a remainder portion of the inflow to be scheduled after assignment to time periods with full pumping capacity of the system 10. The cost rate of the remainder time period will be at least as high as the highest cost rate time period scheduled to pump with maximum pumping capacity. Also, the cost rate of the remainder time period will be at least as low as the lowest cost rate time period in which no pumping is scheduled (time periods with a zero $F_q$).

For equation 3, the value of $R_t$ must be known. $R_t$ represents the excess water volume that is in the tank and could be used to compensate for outflow. Excess water volume could result from establishing a policy of pumping water during the time periods with the lowest cost rates and could include attempting to fill the tank in those time periods regardless of predicted demand. It follows that during higher utility cost rate time periods there may be extra water volume that could be used to meet demand in a cost efficient manner.

Figure 4:
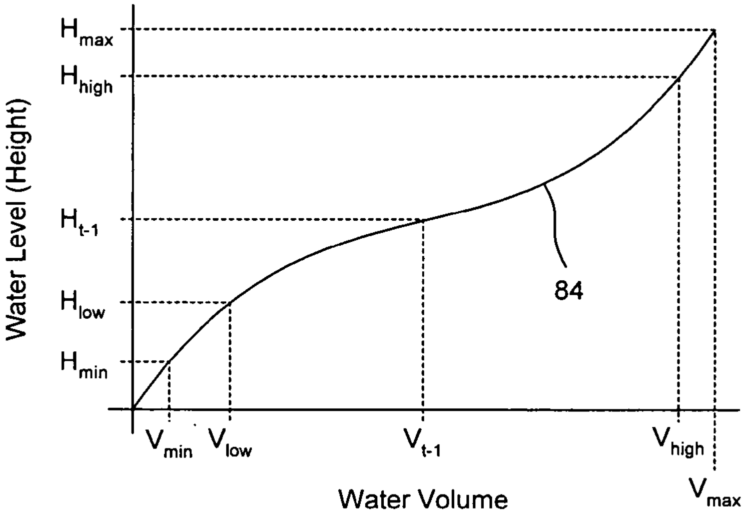
FIG. 4 is a graph illustrating an example map of water level to water volume for a tank of the water system as defined by the shape and dimensions of the tank.

With additional reference to FIG. 4, $R_t$ can be computed using the shape of the tank. The tank shape can be represented by a nonlinear map 84 that represents a function of water height in the tank (y-axis) versus corresponding water volume in the tank (x-axis). A commonly used conoid tank shape, including oblate spheroids and ellipsoids, would render a nonlinear map 84 similar to that shown in FIG. 4. Other shaped tanks (e.g., a cylinder with a conical bottom section) would have differently appearing maps. In FIG. 4, $H_{min}$ and $V_{min}$ correspond to the operational minimum water level constraint, $H_{low}$ and $V_{low}$ correspond to the advisory low level limit for the tank, $H_{t-1}$ and $V_{t-1}$ correspond to the value of $R_t$ as governed by equation 4, $H_{high}$ and $V_{high}$ correspond to the advisory high level limit for the tank, and $H_{max}$ and $V_{max}$ correspond to the maximum amount of water that can be contained in the tank.

$$R_t \cong \frac{-(V_{t-1} - V_{low})}{dt} \qquad \text{Eq. 4}$$

To evaluate I (from equation 3), outflows $O_j$ should be known in addition to $R_t$. When scheduling inflow values, actual outflow values are unknown. Therefore, as a substitute, the scheduling operation can use predicted outflows $O_{j,est}$, the derivation of which is discussed in more detail below.

C(ii). Scheduling by Pumping Capacity and Minimum Water Level

The techniques described in this subheading are directed to revising the scheduling of water inflow established in the preceding subheading giving consideration to the operational minimum water height constraint $H_{min}$ and/or other tank level limits. Also considered are factors such as the cost of peak power demand. This portion of the scheduling relates at least in part to the functionality described with respect to blocks 62-68 of FIG. 2. This portion of the scheduling is intended to continue to assist in minimizing energy cost (e.g., dollar or other currency cost of consumed energy) and is subject to available pumping power. Consumed energy can be expressed in kilowatt-hours (kWH).

One constraint considered during the revised scheduling can be a maximum water level constraint as inflow should be controlled to avoid overflowing of the tank. In one embodiment, the maximum water level constraint is addressed by establishing an override policy of turning all pumps off if the water level in the tank exceeds a maximum water level threshold. However, to reduce repeated turning of the pumps on and off, a deadband can be used to operate the pumps when the water level nears the maximum limit. To establish the deadband, two water levels, referred to as $H_1$ and $H_2$ can be considered. $H_1$ can be the advisory high water level $H_{high}$. $H_2$ can be the average of the absolute high water level $H_{ab\_max}$ and the advisory high water level $H_{high}$, where the advisory high water level is less than the absolute high water level.

Using the values for $H_1$ and $H_2$ the pump control policy set forth in table 2 can be established.

TABLE 2

| Control Policy | Circumstance |
|---|---|
| Turn off all pumps | if actual water level is greater than $H_2$ |
| Operate pumps as scheduled | if actual water level is less than $H_1$ |
| Keep previous operation (turn off all pumps or operate pumps as scheduled) | if $H_1 \leqq$ actual water level $\leqq H_2$ |

Another constraint considered during the revised scheduling can be a minimum water output pressure constraint to assist in satisfactory distribution of water to all consumers. To satisfy this constraint, a measurement can be made to determine what minimum water level, referred to as $H_p$, satisfies the pressure constraint. Then, the pressure constraint is treated along with other water level constraints as set forth below.

As indicated, another constraint considered during the revised scheduling can be a minimum water level constraint, referred to as $H_a$, to assist in maintaining sufficient water availability. From the values of $H_a$ and $H_p$, the operational minimum water level can be determined using equation 5.

$$H_{ab\_min} \triangleq \text{Absolute minimum water level limit} = \max(H_a, H_p) \quad \text{Eq. 5}$$

To create margin for possible error, a water level higher than $H_{ab\_min}$ can be maintained, such as the advisory low water level $H_{low}$. In one embodiment, $H_{min}$ is made to equal $H_{low}$, where $H_{min}$ is used in scheduling as the water level constraint and is referred to in block 62 of FIG. 2.

The scheduling operation can treat the absolute minimum level constraint $H_{ab\_min}$ by establishing an inflow scheduling with an override control. For example, the inflow schedule can be updated such that in the prediction horizon (scheduling day), the predicted water level does not drop below the level $H_{low}$ (denoted $H_{min}$ in block 62 of FIG. 2). However, since scheduling is based on predicted water flow, there may be situations where the prediction is incorrect (e.g., due to higher than expected demand). Therefore, an override policy can be implemented on top of the inflow scheduling. In one embodiment, the override policy is to turn on all pumps if the water level in the tank is less than $H_{ab\_min}$. To reduce repeated turning of the pumps on and off, a deadband can be used to operate the pumps when the water level nears the $H_{ab\_min}$. To establish the deadband, two water levels, referred to as $H_3$ and $H_4$ can be considered. $H_3$ can be the advisory low water level $H_{low}$. $H_4$ can be the average of the absolute low water level $H_{ab\_min}$ and the advisory low water level $H_{low}$, where the advisory low water level is greater than the absolute low water level.

Using the values for $H_3$ and $H_4$ the pump control policy set forth in table 3 can be established.

TABLE 3

| Control Policy | Circumstance |
|---|---|
| Turn on all pumps | if actual water level is less than $H_4$ |
| Operate pumps as scheduled | if actual water level is greater than $H_3$ |
| Keep previous operation (turn on all pumps or operate pumps as scheduled) | if $H_4 \leqq$ actual water level $\leqq H_3$ |

To treat the minimum level constraint $H_{min}$ by scheduling (e.g., block 64), an optimization technique similar to the aforementioned scheduling by pumping capacity without water level constraints can be iteratively used to modify the inflow schedule. In this scheduling process, $F_{t,sch,(k)}$ denotes the pumping schedule for t-th time period after the k-th iteration. Therefore, for the entire prediction horizon F can be expressed as the series $F_{t,sch,(k)}, F_{t+1,sch,(k)}, \ldots, F_{t+M-1,sch,(k)}$. The result of the aforementioned scheduling by pumping capacity without water level constraints is considered to be the $0^{th}$ iteration, which is set forth in equation 6.

$$F_{t+i,sch,(0)} = F_{t+i,(0)} \; \forall i \ni 0 \leqq i \leqq M-1 \quad \text{Eq. 6}$$

As such scheduling may violate $H_{min}$, the revised scheduling can find the first time period in the scheduling day where such violation may happen using the current pumping schedule and outflow projection. As indicated, this time period is the first minimum level violation (FMLV) time period. To this end, the water level is estimated after each time period using equation 7, where $0 \leqq i \leqq M-1$.

$$H_{t+i,est,(k)} = G(G^{-1}(H_{t+i-1,est,(k)}) + (O_{t+i,est} - F_{t+i,sch,(k)}) \times dt) \quad \text{Eq. 7}$$

The m-th time period will be the FMLV time period when equation 8 is satisfied.

$$H_{m,est,(k)} < H_{min} \text{ and } H_{i,est,(k)} \geqq H_{min} \; \forall i \exists t \leqq i < m \quad \text{Eq. 8}$$

Since m will change in each iteration of the scheduling, m can be indexed by k as $m_k$. Outflow occurring before the FMLV time period that caused the minimum level violation (referred to as excess outflow) can be obtained by solving equation 9.

$$ExcessOutflow_{t,(k)} = \frac{G^{-1}(H_{min}) - G^{-1}(H_{m_k,est,(k)})}{dt} \quad \text{Eq. 9}$$

To compensate for the excess outflow, the same amount of inflow is removed from the schedule after the FMLV time period in a manner to maximize the associated reduction in pumping cost to the overall pumping schedule that results from the temporary removal of inflow to pump from the schedule. Also, the same amount of inflow (the excess inflow) is redistributed over the time periods before and including the FMLV time period in a manner to minimize the associated increase in pumping costs to the overall pumping schedule that results from the addition (reassignment) of inflow to pump to the schedule.

For the time periods before and including the FMLV time period, equation 10 is minimized over $F_{t,(k)}, F_{t+1,(k)}, \ldots, F_{t+m_k,(k)}$ and subject to equations 11 and 12, and then solving equation 13.

$$\sum_{j=t}^{t+m_k} F_{j,(k)} C_j \quad \text{Eq. 10}$$

$$0 \le F_{j,(k)} \le F_{max} - F_{j,sch,(k-1)} \quad \text{Eq. 11}$$

$$\sum_{j=t}^{t+m_k} F_{j,(k)} = I_{(k)} = ExcessOutflow_{t,(k)} \quad \text{Eq. 12}$$

$$F_{j,sch,(k)} = F_{j,sch,(k-1)} + F_{j,(k)} \text{ where } t \le j \le t+m_k \quad \text{Eq. 13}$$

For the time periods after the FMLV time period, equation 14 is maximized over $F_{t+m_k+1,(k)}, F_{t+m_k+2,(k)}, \ldots, F_{t+m-1,(k)}$ and subject to equations 15 and 16, and then solving equation 17.

$$\sum_{j=t+m_k+1}^{t+M-1} F_{j,(k)} C_j \quad \text{Eq. 14}$$

$$0 \le F_{j,(k)} \le F_{j,sch,(k-1)} \quad \text{Eq. 15}$$

$$\sum_{j=t+m_k+1}^{t+M-1} F_{j,(k)} = I_{(k)} = ExcessOutflow_{t,(k)} \quad \text{Eq. 16}$$

$$F_{j,sch,(k)} = F_{j,sch,(k-1)} + F_{j,(k)} \text{ where } t+m_k+1 \le j \le t+M-1 \quad \text{Eq. 17}$$

The scheduling for time periods before and including the FMLV time period is similar to the aforementioned scheduling by pumping capacity, but with different constraint values representing remaining pumping capacity.

Scheduling for the time periods after the FMLV time period also is similar to the aforementioned scheduling by pumping capacity, however, the constraint levels represent already scheduled ("used up") pumping capacity. In this case, the time periods are placed in descending utility cost rate order. When two time periods are of the same utility cost rate, the earlier time period is considered first. The scheduling starts with the time period that has the highest cost for the time periods after the FMLV time period. If the scheduled inflow for that time period is zero, $F_{j,(k)}$ becomes zero by operation of equation 15. Scheduling then progresses toward the lower cost time periods. From the first time period with a nonzero inflow scheduled, the scheduling removes as much inflow as possible. The removed inflow amount will be $F_{j,sch,(k-1)}$ if smaller than $I_{(k)}$, and otherwise simply $I_{(k)}$. The scheduling then moves to the next ordered time period and removes as much inflow as possible and this process is repeated until the entire $I_{(k)}$ amount is removed from the overall schedule.

Without intending to be bound by theory, if the aforementioned scheduling by pumping capacity has a solution, then the aforementioned scheduling by pumping capacity and water level constraints also should have a solution for the time periods after the FMLV time period. Under some circumstances, however, the scheduling for time periods before and including the FMLV time period may not have a solution. This case arises when there is not enough capacity in the time periods before and including the FMLV time period to schedule a desired amount of inflow to compensate for the excess outflow. This means that even if all pumps work at full capacity for these time periods, there still may be a minimum level violation. Considering the manner in which the initial scheduling is conducted, this situation could arise when the pumping resources are inadequate for satisfying the demand. Thus, a potential solution is to add more pumping capacity to the system 10.

After iteratively conducting the revised scheduling until no FMLV time periods remain, a revised schedule for pumping is obtained for the prediction time horizon T. In one embodiment, this process includes at most M-times of rescheduling (M iterations). In practice, however, it has been found that the revised schedule is established in much less than M iterations.

C(iii). Properties of the Scheduling Process

Among other observations, five properties of the combination of the foregoing embodiment of the scheduling can be observed and are discussed in this subheading.

First, scheduling is intended to establish a pumping schedule where, when pumping is needed, the pumps are operated at maximum capacity in the lowest available utility cost rate time periods. But when projected outflow indicates that pumping at full capacity is not needed, then the scheduling will schedule pumping at less than maximum capacity.

Second, the scheduling is insensitive to the size of the tank(s) and the scheduling process can be applied to any size or number of tanks. For instance, depending on the size of the tank and/or demand, the tank may be depleted to or near the operational minimum water level constraint $H_{min}$ one or more times during the scheduling day. However, by removing FMLV time periods, the tank should be appropriately filled so that cost is minimized over the scheduling day and the minimum level requirements are satisfied at all times.

Third, the scheduling may be sensitive to the prediction time horizon. For instance, the scheduling day should be divided, or at least divisible, in a manner consistent with the utility cost rate profile. Although the scheduling procedure could be applied to an arbitrary prediction time horizon, when the prediction time horizon is appropriately selected, the utility cost can be optimized.

Fourth, the scheduling may be sensitive to the accuracy of the outflow projection error. For instance, over-projecting the outflow may cause pumping in more costly time periods than necessary and under-projecting outflow may result in losing an opportunity to pump in the least costly time periods.

Fifth, the scheduling may be sensitive with respect to the sampling period, or time period length dt. The time period length determines the rate at which the outflow projection is revised and how often adjustments for errors in the outflow projection are made using the residual flow $R_t$. As the sampling period decreases, the dynamic scheduling should improve, but the amount of computation will correspondingly increase. The sampling period could be established by a number of techniques, such as user configuration, default entry, by modeling or experimentation, or other manner. In a preferred embodiment, the length of time used by the electric utility company to measure the peak power demand is the same as or evenly dividable by the time period length.

C(iv). Schedule Smoothing

The utility cost of pumping can be considered to be the sum up of a number of incremental costs, such as the expense incurred during each time period. The basic cost of energy (e.g., cost per KWH) is a significant cost item for the system 10 and is minimized through the scheduling process described herein. Another cost item is peak power demand cost imposed by the electric utility supplier.

Utility companies often measure and establish a peak power demand level for each electricity consumer. Peak power demand level is typically measured in kilowatts (KW). To establish peak power demand, samples of power demand are obtained in relatively short sampling periods of, for example, 15 or 30 minutes. Power demand is calculated by dividing the energy usage during each sampling period by the length of the period. From the various power demand samples, utility companies establish a peak power demand for each billing cycle, which is usually a month. The peak power demand for a consumer is the observed maximum power demand by that consumer during the billing cycle and a charge proportional to peak power consumption is imposed.

Similar to the way the basic utility energy cost rate can vary over the course of time, utility power demand cost rates can vary and are typically varied in manner that corresponds to the variations in basic energy cost rate. The water inflow scheduling process thus far focuses on minimizing expenses based in the basic energy cost rate. As a result, peak demand costs may be lower than they would be without such scheduling, but the peak demand costs may not be optimally minimized. Therefore, after the water inflow scheduling by pumping capacity and minimum water level is carried out, the inflow schedule can be modified such that the peak power demand cost is further minimized.

To further minimize the peak power demand cost, the scheduling process can include schedule modification to lower the peak demand level. The schedule modification is preferably carried out so as to keep the expense incurred from the basic energy cost rate minimized.

Reducing the peak power demand cost can involve smoothing the scheduled inflows across time periods with the same utility cost rate as the first time period of the scheduling day while considering any minimum water level constraints. The first time period and all subsequent time periods with the same utility cost rate will be referred to as the active cost time periods.

The following example process may be used to smooth the inflow schedule. Smoothing can start with identifying a smoothing horizon, which includes the active cost time periods (e.g., the first time period and subsequent time periods having the same utility cost rate as the first time period). In a preferred embodiment, the smoothing horizon includes only consecutive time periods, which are time periods having the same utility cost rate as the first time period without intervening time periods associated with another utility cost rate.

Next, a total scheduled inflow for the smoothing horizon can be determined by adding the inflow values for each time period in the smoothing horizon. An average scheduled inflow can be determined by dividing the total scheduled inflow by the number of time periods in the smoothing horizon. Prior to smoothing the scheduled inflow over the smoothing horizon, the total amount of inflow scheduled during the smoothing horizon, or total smoothed inflow, can be set to zero. Also set to zero is the amount of inflow that has been moved from one time period to another, or accumulated shuffled inflow amount.

The following reassignment of inflow over the smoothing horizon is iterated for each time period starting with the first time period (time period t) and works chronologically toward the last time period in the smoothing horizon. If the scheduled inflow value for the time period under consideration is smaller than the value of the average scheduled inflow (referred to as circumstance 1), the inflow value for the time period is reset to the value of the average scheduled inflow. The difference in the scheduled inflow value and the value of the average scheduled inflow, which is the added inflow amount for the time period, is added to the value of the accumulated shuffled inflow amount.

If, however, the scheduled inflow value for the time period under consideration is greater than the value of the average scheduled inflow by an amount less than the accumulated shuffled inflow amount (referred to as circumstance 2), then the inflow value for the time period is reduced to the average scheduled inflow value. Also, the accumulated shuffled inflow amount is reduced (decremented) by the amount that is "taken out of" the time period's inflow schedule.

If the scheduled inflow value for the time period under consideration is greater than the value of the average scheduled inflow by an amount more than accumulated shuffled inflow amount (referred to as circumstance 3), then the inflow value for the time period is reduced by the accumulated shuffled inflow amount. Also, the accumulated shuffled inflow amount is reset to zero. In addition, the average scheduled inflow is recalculated to be the average of the scheduled/modified inflows starting from the first time period up to and including the time period under consideration. If a new average scheduled inflow is obtained, the smoothing operation resets the total smoothed inflow to zero and recommences the iterative smoothing of inflow over the smoothing horizon starting at the first time period and using the new average scheduled inflow.

If circumstances 1 or 2 are present or if a new average scheduled inflow is not obtained under circumstance 3, the smoothing progresses as follows. The total smoothed inflow up to and including the time period under consideration is calculated. If the total smoothed inflow is greater or equal to the total scheduled inflow, then the smoothing process can end. Otherwise the smoothing continues by iterating the smoothing process to the next time period. If there are not more time periods left in the smoothing horizon, then the smoothing process can end.

C(v). Minimizing Effects of Outflow Projection Error

As indicated, inflow scheduling is sensitive to errors in projecting outflow. If the actual outflow exceeds the projection, then an operational minimum water level violation may occur and any compensating pumping could result in pumping during high utility cost rate time periods and/or result in increases to the peak power demand cost. To reduce the cost impact of outflow projection errors, the scheduling can include adding a water level margin achieved by pumping extra water when the utility cost rate is low. For example, the scheduling could include an option to schedule inflow to fill the tank to a desired height during the lowest cost time periods. To implement the pumping of extra water, the scheduling could be carried out in the manner described above and then identify when there is unused pumping capacity during the lowest cost time periods. During those times, the pumping of extra water can be scheduled. The additional margin of water could compensate for unpredicted outflow during high cost rate time periods. The scheduling of extra pumping could be added before or after smoothing of the scheduled inflow.

In one embodiment, the pumping of extra water during the lowest cost rate time periods can be carried out in the following manner.

A tank filling inflow amount is determined. In one embodiment, the tank filling inflow amount is the total amount of inflow required to fill the tank from the tank's advisory low limit to the tank's advisory high limit divided by the length of the time period. Next, the scheduled inflow that is the highest for the lowest cost rate time periods is determined. This scheduled inflow amount is referred to as the maximum scheduled inflow. Then, the unused pumping capacity is determined by summing all inflow amounts that could be added to the scheduled inflow of the lowest cost rate time periods to bring all of those inflow amount up to the maximum scheduled inflow.

If the unused capacity exceeds the tank filling inflow amount, then the schedules for the lowest cost time periods are iteratively modified to pump water at the above-determined maximum scheduled inflow starting at the earliest time period and ending when the aggregate increases in pumping is at least as much as the tank filling inflow amount.

If the unused capacity is less than the tank filling inflow amount, then a new maximum scheduled inflow is determined. The new maximum scheduled inflow is obtained by calculating a new inflow level such that if all scheduled inflows are brought up to the new inflow level, then the total amount of inflow in the aggregate will cover the tank filling amount in addition to the originally scheduled inflows. To calculate the new maximum inflow, first the difference of the tank filling inflow amount and unused capacity is evaluated. Then, this difference is divided by the number of time periods in the smoothing horizon. Then, the result is added to the maximum of inflows in the smoothing horizon's original pumping schedule.

C(vi). Predicting Outflow

Water outflow from the tank is based on demand and is an ever changing amount. Factors related to demand may be weather condition, the time of day, size of the customer base, nature of the customer base (e.g., residential, industrial, agricultural, etc.) and unpredictable factors, such as fires. To predict outflow, a moving time window weighted average can be used. For example, equation 18 can be used to predict outflow. In another embodiment where $\alpha_i$ equals $\beta^i$ and $\beta$ is less than 1, then equation 19 can be used. In equations 18 and 19, Q and $\beta$ are constants. A satisfactory value for Q can be 3 and a satisfactory value for $\beta$ can be 0.5, but these values are tunable.

$$O_{t,est} = \frac{\sum_{i=1}^{Q} \alpha_i \times O_{t-i\times M}}{\sum_{i=1}^{Q} \alpha_i} \quad \text{Eq. 18}$$

$$O_{t,est} = \frac{(1-\beta)\sum_{i=1}^{Q} \beta^{i-1} \times O_{t-i\times M}}{1-\beta^{Q}} \quad \text{Eq. 19}$$

The values of $\alpha_i$ are entered by the user and specify the weights that are given to past days' measured outflow amounts in projecting the outflow for the next scheduling day.

If a historical outflow profile that is indicative of actual outflow from time period to time period is not available, scheduling inflow amount may be deferred to undergo a learning phase. Historical outflow data may not be available, for example, when first starting to use the scheduling apparatus 12 in an existing water system 10.

In the learning phase, the scheduling apparatus 12 may measure outflow values to construct an outflow profile. In the following days, but before Q number of days, the scheduling apparatus may undergo a control and learn phase, where less than Q number of days is used in predicting the outflows. After Q number of days, the outflow can be predicted using, for example, equations 18 and 19.

C(vii). Applying the Schedule to Pump Operation

With continuing reference to FIGS. 1 and 2, once the pumping schedule is established, the schedule for the inflow value for each first time period (or selected time periods) can be translated into setpoints for each of the pumps. The pumps can be operated in accordance with those setpoints. In one embodiment, pump setpoints are established for all time periods, but the pumps are controlled in accordance with only the chronologically first time period. Subsequent pump operation is controlled by revising the pumping schedule for an entire scheduling day and reestablishing the pump setpoints for the next time period based on the revised pump schedule. In other embodiments, the pump setpoints can be used for plural time periods before reestablishing the pumping schedule.

For purposes of this description it will be assumed that the pumps 14 are driven with electric motors that fall into two possible drive categories, including constant speed and variable speed. It will further be assumed that any pumps having constant drive speed motors will consume electrical power at a relatively constant rate and the hydraulic power that the pump develops is relatively constant. Pumps having variable drive speed motors will be assumed to be capable of pumping water at correspondingly variable rates.

Hydraulic power, for purposes herein, is measured in gallons per minute (GPM) and can be measured by the corresponding output flow sensor 38. If the pump does not have an output flow sensor, the inflow sensor 40 for the tank 16 could be used to measure a value for the hydraulic power of the pump 14 when that pump 14 is the only one in operation. It is noted that hydraulic power also depends on hydraulic head. However, since the head usually does not change during the course of one scheduling day and is determined by physical characteristics of the system (e.g., relative source, tank and pump locations), hydraulic head will be ignored for the purposes of applying the schedule to pump operation.

In one embodiment, hydraulic power for each pump at the inlet of the tank 16 is used rather than the forgoing pump outlet hydraulic power. For instance, during a learning phase, all pumps are turned on. Then, individual pumps are experimentally turned off and on to observe the effect in overall flow at the tank inlet. From this data, a tank inlet hydraulic power value for each pump can be established.

In a pumping system, many factors may affect the overall system efficiency. Among these factors are pump efficiency, electrical motor efficiency, coupling system efficiency, the type and size of pipes, pipe knees and joints, and so forth. For purposes of applying the pumping schedule, the most highly considered factor can be pump efficiency, which can vary considerably with the pump's output hydraulic power. A best efficiency point (BEP) is the output hydraulic power in GPM for which the pump's efficiency is at a maximum. BEP can be obtained from a pump curve and is a typical characteristic identified on the pump's nameplate. It will be recognized that BEP from a nameplate may change with the age of the pump.

In one embodiment, any pumps with a variable speed drive can be controlled so that the pump is operated close to the BEP. For example, it may be advantageous to operate the pump at a hydraulic power that is slightly larger than the BEP hydraulic power. To regulate a pump's output hydraulic power at or just above the BEP hydraulic power, a proportional plus integral plus derivative (PID) controller can be used with a desired setpoint, such as the BEP hydraulic power. Assuming that variable speed pumps 14 in the system 10 are under PID control, the BEP hydraulic power for each pump can be the basis for assigning flow schedule for the pumps.

Once hydraulic power for each pump is known, scheduled inflow can be distributed among the pumps 14. The hydraulic power can be manually entered into the scheduling apparatus 12 by user configuration or determined by the scheduling apparatus by one of the foregoing techniques.

Establishing the pump setpoints can be conducted using the example process described below, in which $X_j$ denotes the pumping power (e.g., the steady state output hydraulic power) of the j-th pump in the system 10 and there are N pumps in the system. The scheduled inflow $F_{t,sch}$ in the first time period (t) can be assigned to the pumps as follows.

Based on user selection, the scheduling apparatus orders the pumps 14 in ascending or descending pumping power. Absent user selection, the default selection can be ascending pumping power order (e.g., the first pump has the lowest pumping power and the last pump has the highest pumping power) to give priority to operating smaller pumps over larger pumps. The order of the pumps will be referred to as a pump index. Also defined by user entry or default is a cycle time for rotating pumps. A selection scheme (e.g., random or round-robin) can be defined by user entry or default as the scheme for pump rotation.

At the start time of each time period and after calculating the schedule $F_{t,sec}$ in order to distribute the schedule over pumps, two steps are taken. First, a pump is selected based on the pump selection scheme. Second, the schedule is satisfied by using the pump selected in the first step and, if needed, additional pumps in the order of ascending or descending pumping power as selected by the user. The pump selected in the first step will be used for all subsequent update periods until a pump rotation cycle time is elapsed. The pump rotation cycle time could be shorter than or longer than the length of the scheduling day. When the pump rotation cycle time has elapsed, the pump selected in the first step is reestablished depending on the user selected rotation scheme (e.g., random or round-robin). If a random selection scheme is used, the selection scheme randomly selects the pump to use in the foregoing first step if the pumping schedule call for inflow to the tank. Alternatively, if a round-robin rotating selection scheme is used and the pump rotation cycle time is elapsed, the selection scheme will select the pump that follows the previously used first step pump in the pump index to use in the first step. For the description herein, r is used to denote the pump 14 from the N number of pumps 14 selected for operation in the first step.

If no pumping has been scheduled for the first time period of the scheduling day, each pump is assigned an off condition (zero setpoint) and no pumping will occur.

If pumping has been scheduled for the first time period of the scheduling day (a non-zero $F_{t,sch}$ for the time period), at least one pump will be assigned an on condition (non-zero GPM setpoint). Prior to assigning the on or off condition, the availability of the pump can be checked. No assignment of an on condition will be given to unavailable pumps. A pump may be unavailable for a variety of reasons, such as if the pump is taken out of operation for service.

The assignment of pump setpoints could have two rounds of checking all pumps to see if a pump should be used in satisfying the schedule $F_{t,sch}$. Each round starts with examining the r-th pump and advances to examining the next pump in order. In the first round, only the pumps that had an on condition in the previous time period are considered. In this round, it is determined if the pump should be kept on or turned off based on the scheduled inflows. If, after completing the first round, some part of $F_{t,sch}$ remains unassigned, the second round of examining pumps is started. In the second round, which starts from the r-th pumps, the pumps that had an off condition in the previous time period are examined to see if they need to be turned on to satisfy $F_{t,sch}$.

The above scheme of pump override assignment is used to minimize interruption to the pumps' state and has the effect of giving currently operating pumps a higher precedence than the rank of the pump in the pump index. Minimizing turning operating pumps off in favor of turning idle pumps on can assist in avoiding extra utility costs resulting from pump startups and avoiding efficiency loss commonly experienced at pump startup.

A more detailed approach to pump setpoint assignment when pumping is scheduled in the first time period can be as follows. First, the pumps can be evaluated to identify the pumps with an on condition. If a pump is available and has an on condition, then the pump can be assigned an on condition for the time period for which inflow is being assigned. The capacity of the pump is removed from the value of $F_{t,sch}$. This process is continued for available, on condition pumps while there remains any unassigned inflow. The order in which available, on condition pumps are assigned the on condition can be carried out according to the relative order of those pumps in the pump index, pumping capacity (ascending or descending) or the two step process described above. If there are remaining available, on condition pumps after all scheduled inflow is assigned, the remaining pumps can be assigned the off condition and the assignment process can end.

If the are no remaining available on condition pumps or if at the beginning of the condition assignment none of the available pumps are on, and the schedule includes unassigned inflow, then on condition assignments are made to the pumps having an off condition for the time period immediately preceding the time period for which scheduled inflow is being assigned. If an off condition pump is available, then the pump can be assigned an on condition for the time period for which inflow is being assigned. The capacity of the pump is removed from the value of $F_{t,sch}$. This process is continued for available, off condition pumps while there remains any unassigned inflow. The order in which available, off condition pumps are assigned the on condition can be carried out according to the relative order of those pumps in the pump index, pumping capacity (ascending or descending) or the two step process described above. If there are remaining available, off condition pumps after all scheduled inflow if assigned, the remaining pumps can be assigned the off condition and the assignment process can end.

If all pumps in the system 10 have been assigned the on condition and there remains inflow (e.g., $F_{t,sch}$ is greater than zero), the user can be warned of this condition and/or that the system 10 may have insufficient pumping capacity.

The foregoing pump setpoint process is used to set the condition of each pump to be on or off for the entire duration of one time period. This scheme may result in pumping more than scheduled $F_{t,sch}$ for the time period. In one embodiment, the scheduling apparatus 12 allows using the last assigned pump in less than full capacity to approximate match $F_{t,sch}$. For instance, the scheduling apparatus 12 uses an on/off and time proportional scheme with a cycle time equal to one time period to achieve the desired GPM for constant speed pumps and uses PID control in the case of variable speed pumps to achieve the desired GPM.

C(viii). Reporting

With continued reference to FIGS. 1 and 2, the pump assignment routine outlined in the previous sub-section describes the assignment of on/off conditions to each pump for one time period. In one embodiment, the pump assignment process can be repeated for the entire scheduling day (e.g., the t through t+M−1 time periods as shown in FIG. 3). In the preferred embodiment, only the schedule for first time period (e.g., the t time period in FIG. 3) is applied to actual pump operation. The setpoints applied to actual pump operation for subsequent time periods are reassigned based on the revised pumping scheduled associated with time period by time period iteration of the pump scheduling routine. However, in other embodiments, the set points for plural time periods can be applied to actual pump operation.

Repeating the pump setpoint assignment for the entire scheduling day for the current pumping schedule can have some practical utility regardless of how actual pump operation is implemented. For example, the schedule of pump setpoints can be used in the case a sensor fails or there is difficulty in the system that results in the temporary inability to create a pumping schedule. As another example, the user may be interested in seeing an extended pump operation as an estimate of future pump operation, such as for evaluation purposes or planning maintenance. In this case, the estimated pump operation schedule can be displayed or output as on/off values in date and time format rather than a list of setpoints for an associated list of time periods t through t+M−1.

As indicated, the pumps can be controlled in accordance with the pump setpoint automatically under the command of the scheduling apparatus or manually by an operator.

A display (not shown) associated with the scheduling apparatus 12 can be used to display various components of the system 10. For example, each pump 14 can be shown along with the setpoint and availability status. Also shown for each pump 14 can be the time at which the setpoint will change. In one embodiment, expanding an associated icon for the pump 14 will display the setpoint schedule for the pump 14. Each tank 16 can be shown with an indication of the water level and/or water volume in the tank 16. Charts, graphs and/or reports of actual and/or projected water inflow and/or water outflow for each tank 16 can be generated. Charts, graphs and/or reports of historical actual water demand can be generated.

Pump operation can be converted in incurred cost. Charts, graphs and/or reports of historical incurred cost can be generated.

D. CONCLUSION

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of controlling a water supply system having at least one pump and at least one storage facility, wherein power utilized by said water supply system is subject to an energy charge and a demand charge, the method comprising:

a) establishing a scheduling period having a length and dividing the scheduling period into a plurality of time periods, each time period having an associated utility cost rate;

b) establishing an initial pumping schedule constrained by pumping capacity for the scheduling period, the initial pumping schedule having an inflow amount for each time period of the plurality of time periods of the scheduling period that assigns inflow to at least one lowest available cost rate time period before assigning inflow to higher cost rate time periods;

c) repetitively revising the initial pumping schedule with consideration to a minimum water level constraint, wherein revising includes identifying a chronologically first of the time periods where projected water level will violate the minimum water level constraint (FMLV time period) and reassigning scheduled water inflow from after the identified FMLV time period to at least one time period before or including the identified FMLV time period, and wherein the reassigned scheduled water inflow is selected to avoid violation of the minimum water level constraint in the identified FMLV time period, said reassigned scheduled water inflow being reassigned to at least one time period having an associated cost rate that is lower than a cost rate of another time period of the at least one time period before or including the identified FMLV time period, and wherein the reassigned scheduled water inflow assigns as much inflow as the system has the capacity to pump in at least one time period before or including the FMLV time period that is chronologically most distant from a current time period and has the lowest available cost rate before assigning inflow to time periods chronologically closer to the current time period and having the lowest available cost rate, said reassigned scheduled water inflow being reassigned from at least one time period chronologically after the identified FMLV time period that has scheduled inflow and an associated cost rate that is higher than a cost rate of another time period chronologically after the identified FMLV time period, and said reassigned water inflow reassigned from at least one time period chronologically closer to and after the FMLV time period having the same associated cost rate before reassigning inflow from another time period that is chronologically further from and after the FMLV time period and having the same associated cost rate;

d) smoothing the revised pumping schedule for the chronologically first of the time periods and subsequent time periods having the same cost rate over the first time period and the subsequent time periods having the same cost rate to reduce peak power consumption, wherein the sum of the smoothed scheduled water inflow amount up to any time period in the chronologically first of the time periods and the subsequent time periods having the same cost rate will be at least as much as that of the schedule prior to smoothing while any measure of variance of the smoothed scheduled inflow for the chronologically first of the time periods and the subsequent time periods having the same cost rate is at least lower than that of the schedule prior to smoothing;

e) for the first time period of the pumping schedule, controlling, with computer assistance, the at least one pump in accordance with the pumping schedule; and f) after a time interval elapses, repeating b), c), d) and e) to reestablish the pumping schedule for each time period of the next entire upcoming scheduling period and control the at least one pump in accordance with the inflow amount scheduled for the first time period of the reestablished pumping schedule.

2. The method of claim 1, wherein a time period length is selected so that each time period has an associated utility cost rate that is constant for the time period.

3. The method of claim 1, wherein the reassigned amount of inflow is an inflow amount to raise the water level from the projected level to the minimum water level constraint in one time period.

4. The method of claim 1, wherein there are plural pumps, and if inflow is scheduled for a time period and if a pump was running during an immediately prior time period, the running pump is kept on, otherwise a pump is switched on.

5. The method of claim 1, wherein there are plural pumps and if inflow is scheduled for a time period, associating an on setpoint with one of the pumps according to a random or rotating pump selection scheme, and if more pumping capacity is needed to satisfy the scheduled inflow, associating the on setpoint with a second one of the pumps according to pumping power.

6. The method of claim 5, wherein pumps that were running during an immediately prior time period are considered for association with the on setpoint before pumps that were not running during the immediately prior time period.

7. The method of claim 1, wherein establishing the initial pumping schedule is based on projected water outflow from the at least one storage facility.

8. The method of claim 7, wherein the projected water outflow for each time period is based on actual water outflow for the same time period in one or more prior days.

9. The method of claim 7, wherein establishing the initial pumping schedule is further based on an excess water volume in the at least one storage facility.

10. The method of claim 1, further comprising identifying time periods with the lowest cost rate and unused pumping capacity as specified by the revised pumping schedule after step d) and assigning additional inflow to at least one of the identified time periods.

11. The method of claim 1, wherein establishing the initial pumping schedule is based on projected water outflow from the at least one storage facility and identifying time periods with the lowest cost rate and unused pumping capacity as specified by the revised pumping schedule and assigning additional inflow to at least one of the identified time periods.

12. The method of claim 1, wherein establishing the initial pumping schedule assigns as much inflow as the system has the capacity to pump in the chronologically most distant time period having the lowest available cost rate before chronologically closer time periods of the lowest available cost rate.

13. The method of claim 1, further comprising overriding the pumping schedule if a water level in the at least one storage facility falls below a predetermined operational minimum water level constraint.

14. The method of claim 1, further comprising overriding the pumping schedule if a water level in the at least one storage facility exceeds a predetermined operational maximum water level constraint.

15. A scheduling apparatus for controlling a water supply system having at least one pump and at least one storage facility, wherein power utilized by said water supply system is subject to an energy charge and a demand charge, comprising:

a processor;

memory operatively coupled to said processor; and logic stored in said memory and executable by said processor, wherein when executed said logic causes said processor to a) establish a scheduling period having a length and dividing the scheduling period into a plurality of time periods, each time period having an associated utility cost rate;

b) establish an initial pumping schedule constrained by pumping capacity for the scheduling period, the initial pumping schedule having an inflow amount for each time period of the plurality of time periods of the scheduling period that assigns inflow to at least one lowest available cost rate time period before assigning inflow to higher cost rate time periods;

c) repetitively revise the initial pumping schedule with consideration to a minimum water level constraint, wherein revising includes identifying a chronologically first of the time periods where projected water level will violate the minimum water level constraint (FMLV time period) and reassigning scheduled water inflow from after the identified FMLV time period to at least one time period before or including the identified FMLV time period, and wherein the reassigned scheduled water inflow is selected to avoid violation of the minimum water level constraint in the identified FMLV time period, said reassigned scheduled water inflow being reassigned to at least one time period having an associated cost rate that is lower than a cost rate of another time period of the at least one time period before or including the identified FMLV time period, and wherein the reassigned scheduled water inflow assigns as much inflow as the system has the capacity to pump in at least one time period before or including the FMLV time period that is chronologically most distant from a current time period and has the lowest available cost rate before assigning inflow to time periods chronologically closer to the current time period and having the lowest available cost rate, said reassigned scheduled water inflow being reassigned from at least one time period chronologically after the identified FMLV time period that has scheduled inflow and an associated cost rate that is higher than a cost rate of another time period chronologically after the identified FMLV time period, and said reassigned water inflow reassigned from at least one time period chronologically closer to and after the FMLV time period having the same associated cost rate before reassigning inflow from another time period that is chronologically further from and after the FMLV time period and having the same associated cost rate;

d) smooth the revised pumping schedule for the chronologically first of the time periods and subsequent time periods having the same cost rate over the first time period and the subsequent time periods having the same cost rate to reduce peak power consumption, wherein the sum of the smoothed scheduled water inflow amount up to any time period in the chronologically first of the time periods and the subsequent time periods having the same cost rate will be at least as much as that of the schedule prior to smoothing while any measure of variance of the smoothed scheduled inflow for the chronologically first of the time periods and the subsequent time periods having the same cost rate is at least lower than that of the schedule prior to smoothing;

e) control the at least one pump in accordance with the pumping schedule for the first time period of the pumping schedule; and f) repeat b), c), d) and e) after a time interval elapses to reestablish the pumping schedule for each time period of the next entire upcoming scheduling period and control the at least one pump in accordance with the inflow amount scheduled for the first time period of the reestablished pumping schedule.

* * * * *